US009201534B2

(12) United States Patent
Hattori

(10) Patent No.: US 9,201,534 B2
(45) Date of Patent: Dec. 1, 2015

(54) INFORMATION PROCESSING APPARATUS, INFORMATION PROCESSING SYSTEM, INFORMATION PROCESSING METHOD, AND COMPUTER-READABLE STORAGE MEDIUM HAVING STORED THEREIN INFORMATION PROCESSING PROGRAM

(71) Applicant: NINTENDO CO., LTD., Kyoto (JP)

(72) Inventor: Yurie Hattori, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 154 days.

(21) Appl. No.: 13/886,815

(22) Filed: May 3, 2013

(65) Prior Publication Data

US 2014/0085229 A1  Mar. 27, 2014

(30) Foreign Application Priority Data

Sep. 25, 2012  (JP) .................................. 2012-211144

(51) Int. Cl.
*G06F 3/041* (2006.01)
*G06F 3/0481* (2013.01)
*G06F 3/0488* (2013.01)
*A63F 13/426* (2014.01)
*A63F 13/2145* (2014.01)

(52) U.S. Cl.
CPC .......... *G06F 3/0412* (2013.01); *A63F 13/2145* (2013.01); *A63F 13/426* (2013.01); *G06F 3/04815* (2013.01); *G06F 3/04886* (2013.01)

(58) Field of Classification Search
CPC ..... A63F 13/00; G06F 3/0412; G06F 3/04815; G06F 3/04886
USPC ............ 345/156, 173–184; 178/18.01–18.09, 178/19.01–19.04, 20.01
See application file for complete search history.

(56) References Cited

U.S. PATENT DOCUMENTS

| 2004/0021643 | A1 | 2/2004 | Hoshino et al. |
| 2008/0024454 | A1* | 1/2008 | Everest .......................... 345/173 |
| 2011/0019058 | A1* | 1/2011 | Sakai et al. .............. 348/333.01 |
| 2012/0054622 | A1* | 3/2012 | Nankani ........................ 715/730 |

FOREIGN PATENT DOCUMENTS

JP          2004-70492        3/2004

* cited by examiner

*Primary Examiner* — Kumar Patel
*Assistant Examiner* — Insa Sadio
(74) *Attorney, Agent, or Firm* — Nixon & Vanderhye PC

(57) ABSTRACT

In response to an instruction with respect to a rotation button (B1) that is an operation target, an example information processing apparatus (10) displays an expanded rotation button (B1') as an operation region for performing a slide operation, and performs information processing using a parameter that continuously changes in accordance with a slide operation in the operation region.

18 Claims, 7 Drawing Sheets

INFORMATION PROCESSING APPARATUS, INFORMATION PROCESSING SYSTEM, INFORMATION PROCESSING METHOD, AND COMPUTER-READABLE STORAGE MEDIUM HAVING STORED THEREIN INFORMATION PROCESSING PROGRAM

This application claims priority to JP 2012-211144 filed Sep. 25, 2012, the entire contents of which is hereby incorporated herein by reference.

BACKGROUND

1. Field

The technology herein relates to an information processing apparatus that accepts an input operation by a user, an information processing system, an information processing method, and a computer-readable storage medium having stored therein an information processing program.

2. Description of the Related Art

A display apparatus that includes a touch panel is known.

SUMMARY

This application describes a novel information processing apparatus with which input operations are possible.

An information processing apparatus according to an example embodiment includes: an operation region display section that, in response to a first instruction with respect to a first display object, displays an operation region for inputting a second instruction by means of a slide operation; and an information processing section that performs information processing using a parameter that continuously changes in accordance with the second instruction in the operation region.

According to the above configuration, since an operation region for performing a slide operation is displayed, the operability of the slide operation is improved. Furthermore, since display of the operation region is performed in response to a first instruction, in a state in which the first instruction has not been inputted, another display object or the like can be displayed in a portion in which the operation region would be displayed, and thus the display space can be effectively utilized.

The operation region may be displayed in at least two directions that are based on the first display object.

According to the above configuration, a slide operation can be performed in at least two directions that are based on an instruction position of a first instruction.

An operation in one direction among the two directions may correspond to a change in a positive direction of the parameter, and an operation in the other direction among the two directions may correspond to a change in a negative direction of the parameter.

According to the above configuration, a parameter can be increased or decreased based on an instruction position of a first instruction.

When an instruction position of the second instruction becomes an instruction position of the first instruction, the parameter may become a value at the instruction position of the first instruction.

According to the above configuration, a parameter can be returned to an original value thereof by returning an instruction position of a slide operation to an original position thereof.

The operation region may continue from the first display object.

According to the above configuration, a user can intuitively understand that a slide operation is enabled after an instruction with respect to an operation target.

The information processing section may perform information processing in accordance with the second instruction that is continued from the first instruction.

According to the above configuration, an instruction and a slide operation with respect to an operation target can be performed as a series of operations by a user.

The information processing section may perform information processing in real time in accordance with the slide operation.

According to the above configuration, a user can easily determine where a slide operation should be ended.

The information processing section may perform information processing with respect to a second display object in accordance with the parameter.

According to the above configuration, information processing with respect to a processing target can be performed based on a slide operation.

The second display object may be a display object within a virtual space, and may change in accordance with the parameter.

According to the above configuration, information processing with respect to a display object within a virtual space can be performed based on a slide operation. For example, processing that rotates a display object within a virtual space in accordance with a slide amount of a slide operation can be performed.

The operation region display section may end display of the operation region when the second instruction ends.

According to the above configuration, since display of an operation region ends when a slide operation ends, another display object or the like can be displayed at a portion at which the operation region had been displayed, and thus the display space can be effectively utilized.

The information processing may be information processing with respect to a processing target that is different from the first display object.

According to the above configuration, information processing with respect to a processing target can be performed based on a slide operation.

The parameter may continuously change in accordance with a change characteristic of the slide operation.

According to the above configuration, processing can be performed in accordance with a change characteristic of a slide operation with respect to a processing target. In this case, for example, a slide amount, an acceleration, or a speed of a slide operation, or an arbitrary combination of these, corresponds to a change characteristic of a slide operation.

An information processing system according to an example embodiment includes: an operation region display section that, in response to a first instruction with respect to a first display object, displays an operation region for inputting a second instruction by means of a slide operation; and an information processing section that performs information processing using a parameter that continuously changes in accordance with the second instruction in the operation region.

According to the above configuration also, since an operation region for performing a slide operation is displayed, the operability of the slide operation is improved. Furthermore, since display of the operation region is performed in response to a first instruction, in a state in which the first instruction has not been inputted, another display object or the like can be displayed in a portion in which the operation region would be displayed, and thus the display space can be effectively utilized.

An information processing method according to an example embodiment includes: an operation region display step of, in response to a first instruction with respect to a first display object, displaying an operation region for inputting a second instruction by means of a slide operation; and an information processing step of performing information processing using a parameter that continuously changes in accordance with the second instruction in the operation region.

According to the above configuration also, since an operation region for performing a slide operation is displayed, the operability of the slide operation is improved. Furthermore, since display of the operation region is performed in response to a first instruction, in a state in which the first instruction has not been inputted, another display object or the like can be displayed in a portion in which the operation region would be displayed, and thus the display space can be effectively utilized.

A computer-readable storage medium having stored therein an information processing program according to an example embodiment causes a computer to function as: an operation region display section that, in response to a first instruction with respect to a first display object, displays an operation region for inputting a second instruction by means of a slide operation; and an information processing section that performs information processing using a parameter that continuously changes in accordance with the second instruction in the operation region.

According to the above configuration also, since an operation region for performing a slide operation is displayed, the operability of the slide operation is improved. Furthermore, since display of the operation region is performed in response to a first instruction, in a state in which the first instruction has not been inputted, another display object or the like can be displayed in a portion in which the operation region would be displayed, and thus the display space can be effectively utilized.

These and other object, features, aspects and advantages of the technology will become more apparent from the following detailed description of non-limiting example embodiments when taken in conjunction with the accompanying drawings.

DETAILED DESCRIPTION OF THE PREFERRED EMBODIMENTS

Figure 1:
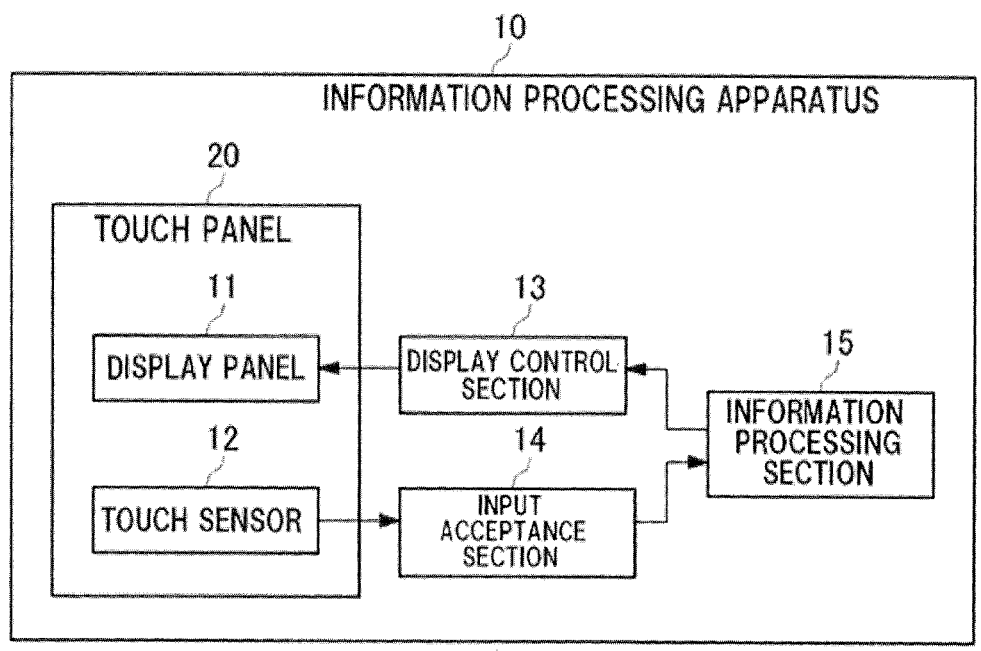
FIG. 1 shows a non-limiting example of a configuration of an information processing apparatus.

Hereunder, non-limiting example embodiments are described with reference to the drawings. FIG. 1 is a block diagram showing a configuration of an information processing apparatus according to a non-limiting example. In the present non-limiting example embodiment, although an information processing apparatus 10 is a portable game console, an information processing apparatus to which the technology is applied may be a smartphone or a tablet terminal or the like, or may be a stationary information processing apparatus such as a home game console or a personal computer.

The information processing apparatus 10 includes a display panel 11, a touch sensor 12, a display control section 13, an input acceptance section 14 and an information processing section 15. The touch sensor 12 is provided on the display panel 11. The display panel 11 and the touch sensor 12 constitute a touch panel 20.

A configuration that includes the display control section 13, the input acceptance section 14 and the information processing section 15 may be realized by a computer that includes an arithmetic processing section and a memory executing a non-limiting example of an information processing program. In this case, the information processing program may be recorded in the information processing apparatus 10, and the information processing apparatus 10 may read out and execute the information processing program therefrom, or the information processing program may be stored on a computer-readable storage medium that is detachably mountable to the information processing apparatus 10, and the information processing apparatus 10 may read out and execute the information processing program from the storage medium that has been mounted to the information processing apparatus 10.

The display panel 11 displays display information that has been output from the display control section 13. The display panel 11 may be an arbitrary panel that is capable of displaying display information, such as a liquid crystal display panel. As described above, the touch sensor 12 is provided on the display panel 11. The touch sensor 12 performs sampling at a predetermined sampling rate (for example, 30 samples/sec). When the touch sensor 12 senses contact (touching) with a material object, the touch sensor 12 outputs a signal that indicates the contact position. The method by which the touch sensor 12 senses contact with a material object may be an arbitrary method such as a capacitive sensing method or a resistive film method. A touch onto the touch sensor 12 may be a touch of a finger or may be a touch by a stylus.

The display control section 13 controls the display of the display panel 11 in accordance with information processing in the information processing section 15. The input acceptance section 14 receives a signal that indicates a contact position from the touch sensor 12 and recognizes the contents of the input operation. The information processing section 15 receives information of the input operation from the input acceptance section 14 and performs predetermined information processing, and outputs a result of the information processing to the display control section 13. In the present non-limiting example embodiment, as one example, the information processing section 15 performs processing that rotates a display object within a virtual space.

Figure 2:
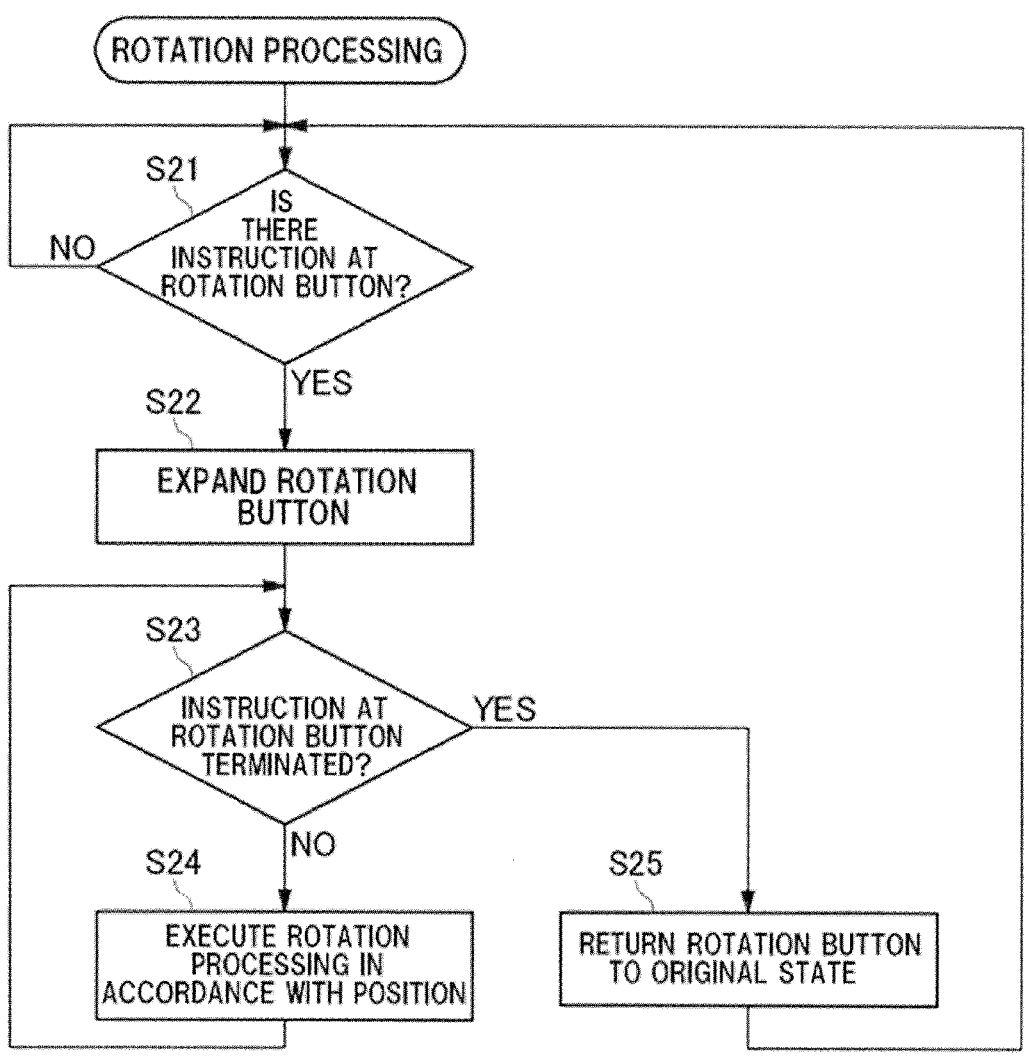
FIG. 2 shows a non-limiting example of a flowchart that illustrates rotation processing.

FIG. 2 is a flowchart that illustrates rotation processing that is performed with respect to a display object in the information processing apparatus 10 of the present non-limiting example embodiment. FIG. 3 and FIGS. 4A to 4D are views that illustrate examples of the display of the touch panel 20. Hereunder, rotation processing that is performed with respect to a display object in the information processing apparatus 10 is described with reference to FIG. 3 and FIGS. 4A to 49.

Figure 3:
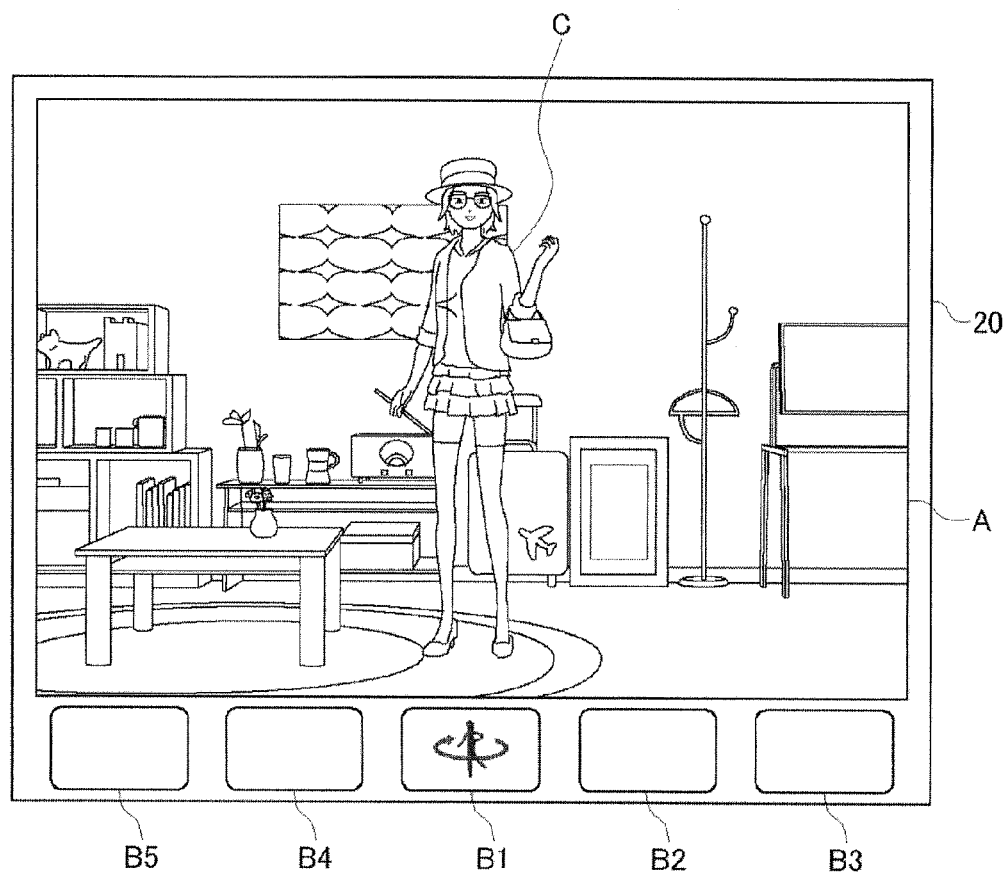
FIG. 3 shows a non-limiting example of a display of a touch panel (a state in which a rotation button is not pressed)

FIG. 3 illustrates an example of the display of the touch panel 20 when rotation processing with respect to a display object is not instructed. An object display area A in which a display object C (second display object) that is within a virtual space is displayed, and a group of buttons B1 to B5 that are disposed below the object display area A are displayed on the screen of the touch panel 20. The display object C is displayed as a target of rotation processing in the object display area A. The group of buttons B1 to B5 is arranged side by side in the lateral direction. A center button B1 (first display object) among the group of buttons B1 to B5 is a rotation button for rotating the display object C within the virtual space. The rotation button B1 is an operation target for performing a rotation operation with respect to the display object C. The other buttons B2 to B5 that are on both sides of the rotation button B1 may be arbitrary buttons such as a menu button and a zoom button.

Upon starting rotation processing, first, the information processing section 15 determines whether or not an instruction has been input at the rotation button B1, that is, whether or not information was inputted from the input acceptance section 14 to the effect that there was contact on the rotation button B1 (step S21). According to the present non-limiting example embodiment, input of an instruction at the rotation button B1 is, more specifically, touching (for example, continuous touching) of the rotation button B1. Input of an instruction at the rotation button B1 may also be in the form of, for example, a long touch of the rotation button B1 (touching that continues for a predetermined time period (for example, 1 second) or more), or a double touch of the rotation button B1 (two touches within a predetermined time period (for example, 0.5 seconds) or less).

If the rotation button B1 has not been touched (No in step S21), the information processing section 15 continues to determine the existence/non-existence of a touch until the rotation button B1 is touched (step S21). When the rotation button B1 is touched (Yes in step S21), that is, when the touch sensor 12 senses contact with a material object at the display position of the rotation button B1, and the input acceptance section 14 sends information indicating that the rotation button B1 was touched to the information processing section 15, the information processing section 15 instructs the display control section 13 to perform processing that expands the rotation button B1, the display control section 13 outputs display information of an expanded rotation button B1' to the display panel 11, and the display panel 11 displays the expanded rotation button B1' (step S22).

Figure 4A:
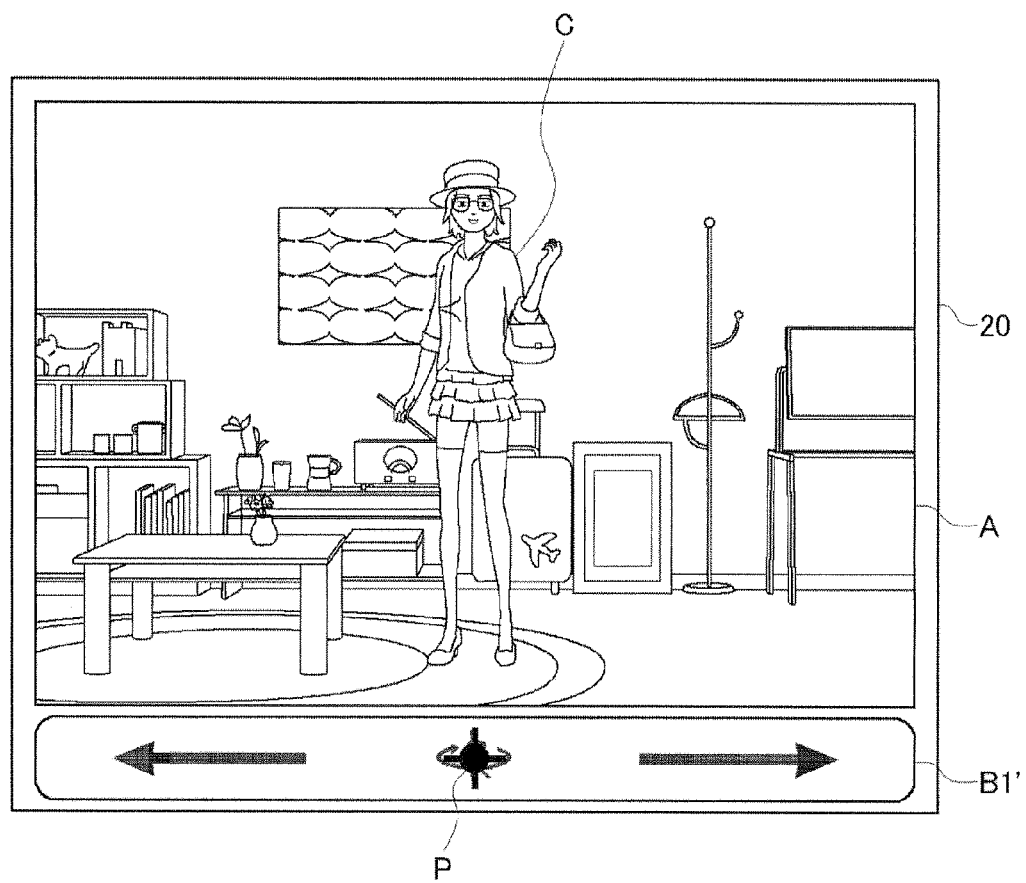
FIG. 4A shows a non-limiting example of a display of a touch panel (a state in which a rotation button is pressed)

FIG. 4A is a view that illustrates an example of the display when the rotation button B1 has been touched and the expanded rotation button B1' is displayed. As shown in FIG. 4A, the rotation button B1 is expanded into the region in which the other buttons B2 to 35 had been displayed, and as a result, the other buttons B2 to B5 are concealed by the extension portion of the expanded rotation button B1'. When the rotation button 31 is touched, the rotation button B1 expands in both the right and left directions. A rightward arrow that indicates rotation in the right direction appears in a portion on the right side of the expanded rotation button B1', and a leftward arrow that indicates rotation in the left direction appears in a portion on the left side of the expanded rotation button B1'. The expanded rotation button B1' serves an operation region that accepts a slide operation for rotating the display object C.

When the expanded rotation button B1' is displayed, the information processing section 15 determines whether or not an instruction with respect to the expanded rotation button B1' has been terminated (step S23). Specifically, when the input acceptance section 14 no longer senses touching of the expanded rotation button B1' and information indicating that the expanded rotation button B1' is being touched is no longer inputted from the input acceptance section 14, the information processing section 15 determines that the instruction with respect to the rotation button has been terminated (Yes in step S23). On the other hand, if the input acceptance section 14 senses touching of the expanded rotation button B1' and information indicating that the expanded rotation button B1' is being touched is inputted from the input acceptance section 14, the information processing section 15 determines that the instruction with respect to the rotation button has not been terminated (No in step S23).

Figure 4B:
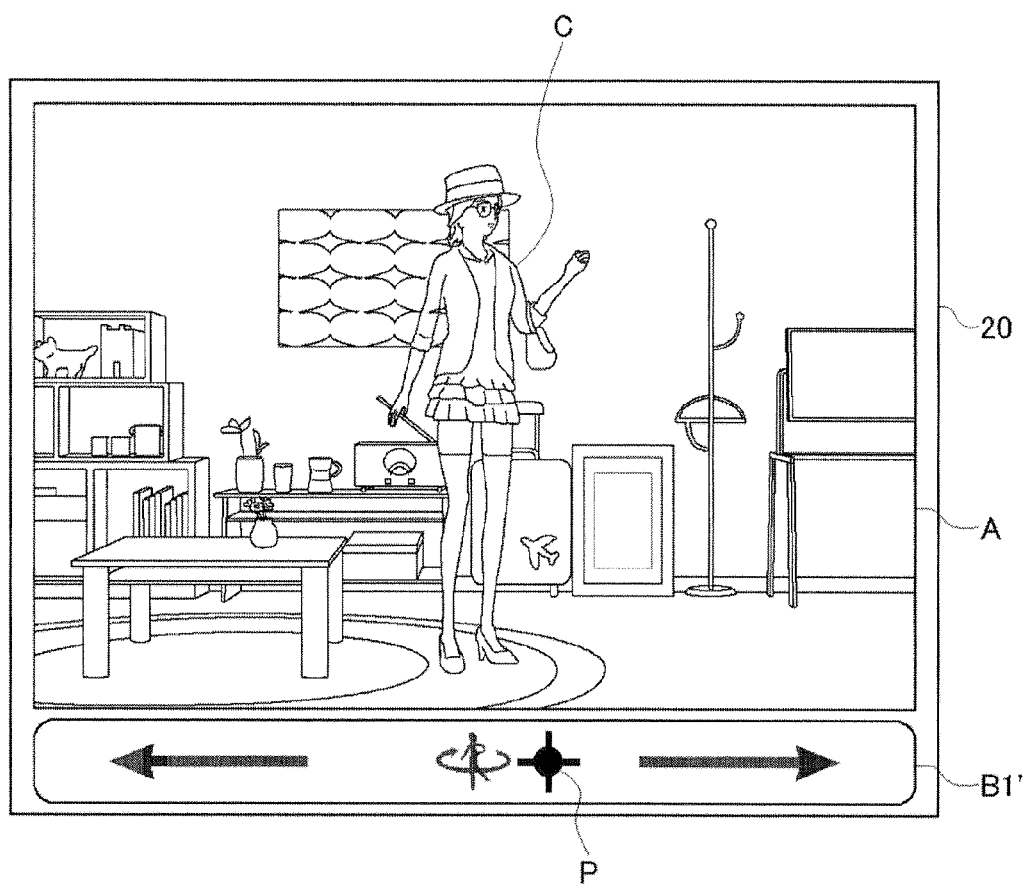
FIG. 4B shows a non-limiting example of a display of a touch panel (during a slide operation)
Figure 4C:
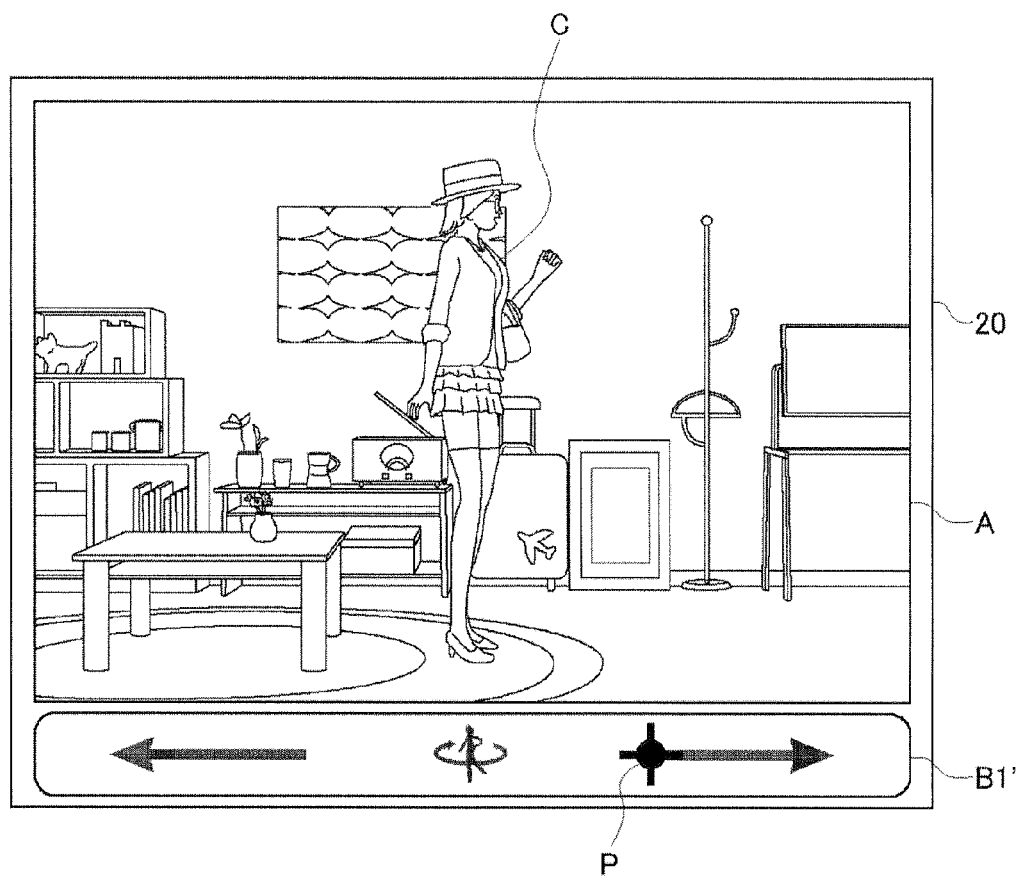
FIG. 4C shows a non-limiting example of a display of a touch panel (during a slide operation)
Figure 4D:
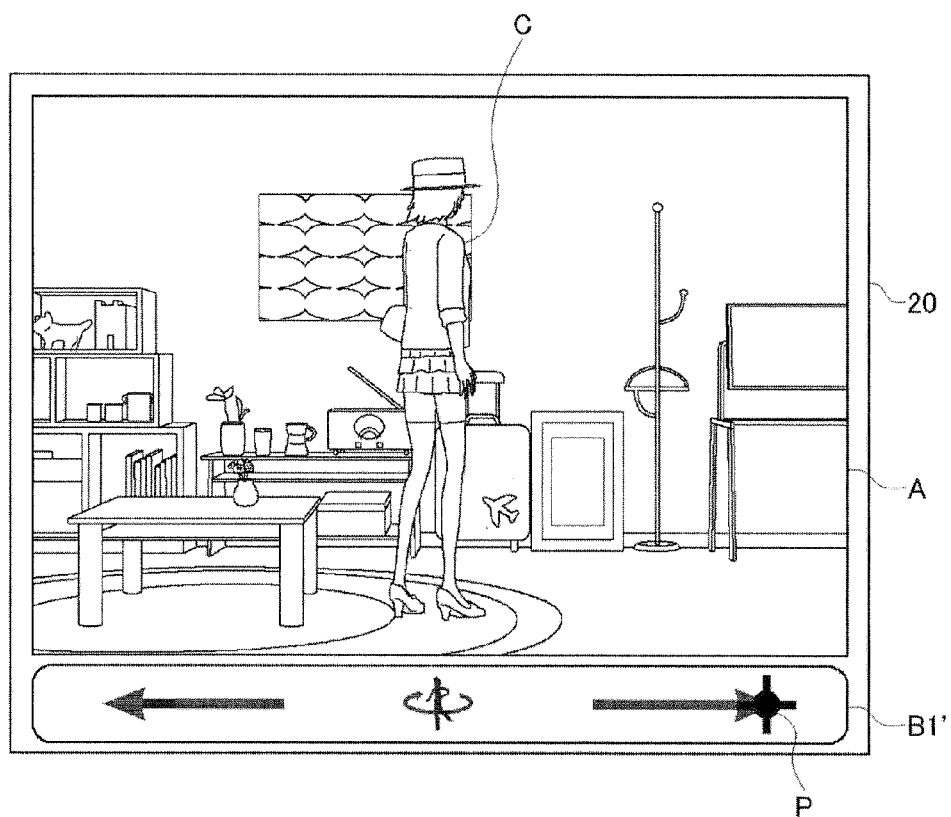
FIG. 4D shows a non-limiting example of a display of a touch panel (during a slide operation).

If the instruction with respect to the rotation button has not been terminated (No in step S23), the information processing section 15 performs rotation processing in accordance with the contact position (step S24). FIG. 4B to FIG. 4D illustrate a slide operation with respect to the expanded rotation button B1' and rotation of the display object that corresponds thereto. When a user touches the display position of the rotation button B1 as an instruction with respect to the rotation button B1 (first instruction), and performs a slide operation on the expanded rotation button B1' in the transverse direction while continually touching the display position of the rotation button B1 and not releasing their touch therefrom (second instruction), the display object C rotates in accordance with the direction and amount of the slide operation. That is, a parameter of a rotation angle of the rotation processing in the information processing section 15 continuously changes in accordance with the direction and amount of the slide operation.

As shown in FIG. 4B, when a contact position P is slid slightly to the right side of the center of the expanded rotation button B1', the display object C rotates somewhat to the right (left direction as viewed from the display object) within the virtual space. As shown in FIG. 4C and FIG. 4D, when the contact position P is slid further to the right side, the display object C rotates further to the right within the virtual space, and when the contact position P reaches the right end of the expanded rotation button B1', the display object faces almost completely rearward. Further, when the contact position P returns to the position of the original rotation button B1 in the state thereof prior to expansion, the display object returns to the angle thereof prior to performance of the operation with respect to the rotation button B1.

At this time, the information processing section 15 receives information indicating which position of the expanded rotation button B1' is being touched from the input acceptance section 14, performs processing to rotate the display object C at an angle that is in accordance with a distance from the center of the expanded rotation button B1' to the contact position, and outputs the processing result to the display control section 13. That is, the information processing section 15 does not first start to perform rotation processing with respect to the display object C after a slide operation ends when contact on the expanded rotation button B1' is released after the slide operation, but rather performs rotation processing in real time during the slide operation to thereby rotate the display object C at an angle that corresponds to the contact position at that time.

When the user terminates the instruction (contact) at the expanded rotation button B1' at an arbitrary position of the expanded rotation button B1', the rotation angle of the display object C is fixed at an angle that corresponds to the contact position at that time. Therefore, when the user slides the touch position laterally on the expanded rotation button B1', the display object C rotates in correspondence therewith, and the user can fix the orientation of the display object C at the preferred angle of the user by terminating the instruction with respect to the expanded rotation button B1' at the relevant position.

When the instruction with respect to the rotation button is terminated (Yes in step S23), the display object C stops at the relevant angle, and the expanded rotation button B1' returns to the original size rotation button B1 (step S25), and the processing returns to step S21 to wait for the next instruction at the rotation button B1.

As described above, the information processing apparatus 10 of the present non-limiting example embodiment that is shown as one example displays the expanded rotation button B1' for performing a slide operation in response to an instruction (touching) (first instruction) with respect to the rotation button B1 as an operation target, and performs rotation processing with respect to the display object C as a processing target in accordance with a slide operation (second instruction) on the expanded rotation button B1'. Therefore, since the expanded rotation button B1' serves as an operation region for a slide operation, the user can easily recognize the region in which a slide operation is effective, thereby enhancing the operability. Further, since the rotation button B1 is expanded when the rotation button B1 is touched, the other buttons B2 to B5 can be displayed around the rotation button B1 before the rotation button B1 is expanded upon input of an instruction thereto, and thus the display space can be effectively utilized.

Note that, in the above described non-limiting example embodiment, when the rotation button B1 that is an operation target is expanded, the expanded button is shown as an operation region in which a slide operation can be performed, however an operation region is not limited thereto. For example, a configuration may be adopted in which, when an instruction is inputted at an operation target, the original size operation target itself serves as a slider, and a rail on which the slider can be slid is displayed as an operation region. In this case also, since a rail is displayed, the operability of the slide operation is enhanced, and furthermore, since the rail is not displayed until an instruction is inputted at the operation target, the display space can be effectively utilized.

Further, although in the above described non-limiting example embodiment an operation region is extended in the transverse direction of the rotation button B1 that is an operation target, the extension direction is not limited thereto. The operation region may also be extended in the vertical direction of the operation target. In addition, a circle or circular arc that passes through the operation target may be extended as an operation region. When an operation region for a slide operation is extended in at least two directions from an operation target, if information processing is performed using a parameter that is in accordance with a change characteristic of the slide operation, an operation in one of the directions can be employed as an operation that changes the parameter in a positive direction, and an operation in the other direction can be employed as an operation that changes the parameter in a negative direction. Furthermore, an operation region may be extended in three or more directions from an operation target, and may also be extended in a two-dimensional shape.

In addition, in the above described non-limiting example embodiment, a configuration is adopted in which rotation processing with respect to a display object is performed as information processing in real time during a slide operation, and when the slide operation ends and the instruction with respect to the rotation button B1 that is the operation target is terminated, the rotation angle of the display object is fixed in accordance with the slide operation at that time. However, rotation processing with respect to a display object is not limited thereto. For example, a configuration may be adopted in which the information processing section 15 performs rotation processing in real time in accordance with a slide operation, and when the slide operation ends, returns the rotation angle of the display object to the original angle thereof. Furthermore, a configuration may also be adopted in which the information processing section 15 does not perform rotation processing with respect to a display object until a slide operation ends, and at the time that the slide operation has ended, changes the display angle of the display object in accordance with the slide position at that time.

Further, according to the above described non-limiting example embodiment, upon input of an instruction (touching) at the rotation button B1 that is the operation target, an operation region that continues from the rotation button appears and the user can perform a slide operation in the operation region without terminating the instruction with respect to the rotation button B1. However, a display position of the operation region is not limited thereto. For example, an operation region for a slide operation need not necessarily be continuous from an operation target, and a configuration may also be adopted in which when an instruction is input to extend an operation region for a slide operation with respect to an operation target, the operation region is extended at a position that is separated from the operation target. In this case, a configuration may be adopted in which, when the slide operation ends, the operation region is closed in response to an instruction for closing the operation region.

In addition, although according to the above described non-limiting example embodiment, information processing based on a slide operation is processing with respect to a processing target that is different from the rotation button that is the operation target, information processing based on a slide operation is not limited thereto. For example, a configuration may be adopted in which, when performing processing that rotates a display object within a virtual space such as in the above described non-limiting example embodiment, when the display object itself is touched (designated), an operation region for a slide operation extends therefrom and the display object rotates in accordance with a slide operation in the operation region.

Furthermore, although according to the above described non-limiting example embodiment the information processing section 15 performs processing in accordance with a slide amount of a slide operation, information processing in accordance with a slide operation is not limited thereto, and a configuration may also be adopted in which information processing is performed in accordance with a change characteristic of a slide operation. Change characteristics of a slide operation include an acceleration and a speed of a slide operation, in addition to a slide amount of a slide operation.

Further, the information processing section 15 may take a speed of a slide operation immediately before an instruction at an operation target is terminated as a change characteristic of the slide operation, and may perform information processing in accordance with that change characteristic. Thus, information processing that is based on a click operation is enabled. For example, in the above described non-limiting example embodiment, in a case where a display object is rotated in real time in accordance with a slide operation and, in conjunction therewith, the input acceptance section 14 detected a click operation, the display object may be rotated at a rotation angle that is in accordance with the strength of the click operation (the magnitude of the speed of the slide operation immediately before the instruction at the operation target is terminated).

In addition, although according to the above described non-limiting example embodiment the information processing section 15 rotates a display object within a virtual space as information processing in accordance with a slide operation, information processing in accordance with a slide operation is not limited thereto, and may be processing using a parameter that continuously changes in accordance with a change characteristic of a slide operation. For example, information processing in accordance with a slide operation may be processing that changes a correction parameter at a time of image correction. Further, information processing in accordance with a slide operation is not limited to processing with respect to a display object and, for example, may be processing that adjusts the sound volume of the information processing apparatus.

Furthermore, although according to the above described non-limiting example embodiment, using the touch panel 20, touching or sliding with respect to the touch panel is adopted as an input operation, the technology can also be applied to an information processing apparatus in which, for example, a pointer is displayed on a display panel and it is possible to designate an operation target and designate a position using a pointing device such as a mouse, a pad, cross keys or a stick.

In addition, although in the above described non-limiting example embodiment the display panel 11, the touch sensor 12, the display control section 13, the input acceptance section 14 and the information processing section 15 are integrated within the information processing apparatus 10, a configuration may also be adopted in which, among these elements, some elements and other elements are arranged in a dispersed manner and are connected to each other through a network. For example, an information processing system may be configured which includes a terminal in which the touch panel 20, the display control section 13 and the input acceptance section 14 are integrated, and a server that includes the information processing section 15.

While the technology has been described in detail, the foregoing description is in all aspects illustrative and not restrictive. It will be understood that numerous other modifications and variations can be devised.

What is claimed is:

1. An information processing apparatus, comprising a processing system, including at least one processor, the processing system being at least configured to:
   regardless of a first instruction, display a first display object;
   display a control button on each of two sides of the first display object and adjacent to the first display object;
   in response to the first instruction to the first display object, display an operation region for inputting a second instruction by means of a slide operation, the operation region for inputting the second instruction being displayed such that (1) the operation region extends from the two sides of the first display object and (2) conceals the control buttons adjacent to the first display object; and
   perform information processing using a parameter that continuously changes in accordance with the second instruction in the displayed operation region.

2. The information processing apparatus according to claim 1, wherein the operation region is displayed in at least two directions that are based on the first display object.

3. The information processing apparatus according to claim 2, wherein an operation in one direction among the two directions corresponds to a change in a positive direction of the parameter, and an operation in the other direction among the two directions corresponds to a change in a negative direction of the parameter.

4. The information processing apparatus according to claim 2, wherein when an instruction position of the second instruction becomes an instruction position of the first instruction, the parameter becomes a value at the instruction position of the first instruction.

5. The information processing apparatus according to claim 1, wherein the operation region continues from the first display object.

6. The information processing apparatus according to claim 1, wherein the information processing is performed in accordance with the second instruction that is continued from the first instruction.

7. The information processing apparatus according to claim 1, wherein the information processing is performed in real time in accordance with the slide operation.

8. The information processing apparatus according to claim 1, wherein the information processing is performed with respect to a second display object in accordance with the parameter.

9. The information processing apparatus according to claim 8, wherein the second display object is a display object within a virtual space, and changes in accordance with the parameter.

10. The information processing apparatus according to claim 1, wherein display of the operation region is ended when the second instruction ends.

11. The information processing apparatus according to claim 1, wherein the information processing is information processing with respect to a processing target that is different from the first display object.

12. The information processing apparatus according to claim 1, wherein the parameter continuously changes in accordance with a change characteristic of the slide operation.

13. The information processing apparatus according to claim 1, wherein in response to the first instruction to the first display object, the processing system is configured to display the operation region for inputting the second instruction such that the operation region extends from two opposite sides of the first display object.

14. The information processing apparatus according to claim 1, wherein in response to the first instruction to the first display object, the processing system is configured to display the operation region for inputting the second instruction such that the operation region extends from two opposite sides of the first display object, and wherein the operation region is a rail object along which the first display object is slid in response to the second instruction.

15. The information processing apparatus according to claim 1, wherein the information processing performed using the parameter that continuously changes in accordance with the second instruction in the displayed operation region, is rotation of a virtual object within a virtual space in accordance with the second instruction in the displayed operation region.

16. An information processing system, comprising:
    a display;
    an input device for receiving instructions;
    a processing system coupled to the display and the input device, the processing system including at least one processor and being at least configured to;
    regardless of a first instruction, display on the display a first display object;

display a control button on each of two sides of the first display object and adjacent to the first display object;

in response to the first instruction to the first display object, display an operation region for inputting a second instruction by means of a slide operation, the operation region for inputting the second instruction being displayed such that (1) the operation region extends from the two sides of the first display object and (2) conceals the control buttons adjacent to the first display object; and perform information processing using a parameter that continuously changes in accordance with the second instruction in the operation region.

17. An information processing method, comprising:

regardless of a first instruction, displaying on the display a first display object;

display a control button on each of two sides of the first display object and adjacent to the first display object;

in response to the first instruction to the first display object, displaying an operation region for inputting a second instruction by means of a slide operation, the operation region for inputting the second instruction being displayed such that (1) the operation region extends from the two sides of the first display object and (2) conceals the control buttons adjacent to the first display object; and performing information processing using a parameter that continuously changes in accordance with the second instruction in the operation region.

18. A non-transitory computer-readable storage medium having stored therein an information processing program, when executed, causing a computer of an information processing apparatus to provide functionality comprising:

first display object display that, regardless of a first instruction, displays a first display object;

control button display that displays a control button on each of two sides of the first display object and adjacent to the first display object;

operation region display that, in response to the first instruction to the first display object, displays an operation region for inputting a second instruction by means of a slide operation, the operation region for inputting the second instruction being displayed such that (1) the operation region extends from the two sides of the first display object and (2) conceals the control buttons adjacent to the first display object; and information processing that performs information processing using a parameter that continuously changes in accordance with the second instruction in the operation region.

* * * * *